United States Patent
Chen et al.

(10) Patent No.: US 9,706,227 B2
(45) Date of Patent: Jul. 11, 2017

(54) VIDEO CODING TECHNIQUES FOR CODING DEPENDENT PICTURES AFTER RANDOM ACCESS

(75) Inventors: Ying Chen, San Diego, CA (US); Muhammed Zeyd Coban, Carlsbad, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 918 days.

(21) Appl. No.: 13/415,453

(22) Filed: Mar. 8, 2012

(65) Prior Publication Data
US 2012/0230433 A1    Sep. 13, 2012

Related U.S. Application Data

(60) Provisional application No. 61/451,453, filed on Mar. 10, 2011, provisional application No. 61/454,548, filed on Mar. 20, 2011.

(51) Int. Cl.
| | | |
|---|---|---|
| *H04N 7/12* | (2006.01) | |
| *H04N 19/70* | (2014.01) | |
| *H04N 19/503* | (2014.01) | |
| *G06T 9/00* | (2006.01) | |
| *H04N 19/61* | (2014.01) | |

(52) U.S. Cl.
CPC ............. *H04N 19/70* (2014.11); *G06T 9/004* (2013.01); *H04N 19/503* (2014.11); *H04N 19/61* (2014.11)

(58) Field of Classification Search
USPC ..................................................... 375/240.25
See application file for complete search history.

(56) References Cited

U.S. PATENT DOCUMENTS

| | | | |
|---|---|---|---|
| 7,346,216 B2 | 3/2008 | Adachi et al. | |
| 8,107,744 B2 | 1/2012 | Tian et al. | |
| 2004/0025000 A1 | 2/2004 | Wise et al. | |
| 2004/0066854 A1* | 4/2004 | Hannuksela | ............. 375/240.27 |
| 2007/0003149 A1* | 1/2007 | Nagumo et al. | ............. 382/233 |
| 2007/0073779 A1* | 3/2007 | Walker et al. | ............. 707/104.1 |
| 2008/0123736 A1 | 5/2008 | Sekiguchi et al. | |
| 2008/0165864 A1 | 7/2008 | Eleftheriadis et al. | |

(Continued)

FOREIGN PATENT DOCUMENTS

| | | |
|---|---|---|
| CN | 101198052 A | 6/2008 |
| JP | 2005533444 A | 11/2005 |

(Continued)

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

(Continued)

*Primary Examiner* — Tracy Y Li

(57) ABSTRACT

In general, this disclosure describes techniques for coding video data for random access. In particular, this disclosure proposes to code a syntax element that indicates if a dependent picture may be successfully decoded in the event of a random access request to a clean decoding refresh (CDR) picture and may be required for decoding the pictures following the clean decoding refresh (CDR) picture in display order.

16 Claims, 8 Drawing Sheets

(56) References Cited

U.S. PATENT DOCUMENTS

| | | | |
|---|---|---|---|
| 2008/0205511 A1* | 8/2008 | Hannuksela et al. | 375/240.01 |
| 2008/0260045 A1 | 10/2008 | Rodriguez et al. | |
| 2009/0003447 A1 | 1/2009 | Christoffersen et al. | |
| 2010/0008420 A1* | 1/2010 | Lin | 375/240.15 |
| 2010/0118944 A1 | 5/2010 | Tanaka et al. | |
| 2010/0189182 A1* | 7/2010 | Hannuksela | 375/240.25 |
| 2012/0023250 A1 | 1/2012 | Chen | |

FOREIGN PATENT DOCUMENTS

| | | |
|---|---|---|
| JP | 2010041354 A | 2/2010 |
| RU | 2310290 C2 | 11/2007 |
| RU | 2368095 C1 | 9/2009 |
| WO | 2004008735 A2 | 1/2004 |
| WO | 2004109582 A2 | 12/2004 |
| WO | 2007038695 | 4/2007 |
| WO | 2009143066 A1 | 11/2009 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al: "Comments on Clean Decoding Refresh Pictures", JCT-VC Meeting; MPEG Meeting; Mar. 16-23, 2011; Geneva;(Joint Collaborative Team on Video Coding of ISO/IEC JTC1/SC29/WG11 and ITU-T SG.16); URL: http://wftp3.itu.int/av-arch/jc tvc-site/,,No. JCTVC-E400, XP030008906, ISSN: 0000-0005, 4 pp.

Fujibayashi et al: "Random access support for HEVC",JCT-VC Meeting; MPEG Meeting; Jan. 20-28, 2011; Daegu;(Joint Collaborative Team on Video Coding of ISO/IEC JTC1/SC29/WG11 AND ITU-T SG.16 ); URL: http://wftp3.itu.int/av-arch/jc tvc-site/, , No. JCTVC-D234, XP030008274, ISSN: 0000-0013, 8 pp.

International Preliminary Report on Patentability—PCT/US2012/028490—The International Bureau of WIPO—Geneva, Switzerland, Apr. 29, 2013, 9 pp.

International Search Report and Written Opinion—PCT/US2012/028490—ISA/EPO, May 29, 2012, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand et al., "WD1: Working Draft 1 of High-Efficiency Video Coding", JCTVC-C403, 3rd Meeting: Guangzhou, CN, Oct. 7-15, 2010, 137 pp.

Second Written Opinion from International application PCT/US2012/028490, dated Feb. 11, 2013, 6 pp.

"High Efficiency Video Coding (HEVC) text specification draft 6," version 21, JCTVC-H1003, edited by B. Bross, W.J. Han, G. J. Sullivan, J.R. Ohm, T. Wiegand, dated Feb. 17, 2012.

* cited by examiner

VIDEO CODING TECHNIQUES FOR CODING DEPENDENT PICTURES AFTER RANDOM ACCESS

This application claims priority to U.S. Provisional Application No. 61/451,453, filed Mar. 10, 2011, and U.S. Provisional Application No. 61/454,548, filed Mar. 20, 2011, both of which are hereby incorporated by reference in their entirety.

TECHNICAL FIELD

This disclosure relates to video coding and, more particularly, to video coding techniques for random access.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques may include spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction uses a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data for random access. In particular, this disclosure proposes to code a syntax element that indicates if a potentially unnecessary picture is a dependent picture that may be successfully decoded in the event of a random access request to a clean decoding refresh (CDR) picture. A dependent picture is a picture that is used for decoding the pictures following the clean decoding refresh (CDR) picture in display order.

In one example of the disclosure, a method of encoding video data comprises encoding a group of pictures that includes a clean decoding refresh (CDR) picture and one or more potentially unnecessary pictures, which may be required by the pictures following the CDR picture in display order, determining if any of the one or more potentially unnecessary pictures is a dependent picture, determining if the dependent picture is decodable in the case that the CDR picture is used for random access, and signaling a syntax element indicating that the dependent picture is determined to be decodable in the case that the CDR picture is used for random access.

In another example of the disclosure, a method of decoding video data comprises receiving a group of pictures including a clean decoding refresh (CDR) picture and one or more potentially unnecessary pictures, and receiving a syntax element indicating whether or not any of the one or more potentially unnecessary pictures is a dependent picture that is decodable in the case that a request for random access to the CDR picture is received. The method of decoding may further comprise receiving a request for random access to the CDR picture, decoding the CDR picture in response to the request for random access, decoding the dependent picture corresponding to the received syntax element, and skipping decoding for any of the one or more potentially unnecessary pictures that are not indicated to be dependent pictures by the received syntax element.

The encoding and decoding methods described above may also be implemented as an apparatus (e.g., by a video encoder or video decoder) or through instructions stored on a computer-readable medium.

The details of one or more examples are set forth in the accompanying drawings and the description below. Other features, objects, and advantages will be apparent from the description and drawings, and from the claims.

DETAILED DESCRIPTION

Figure 1:
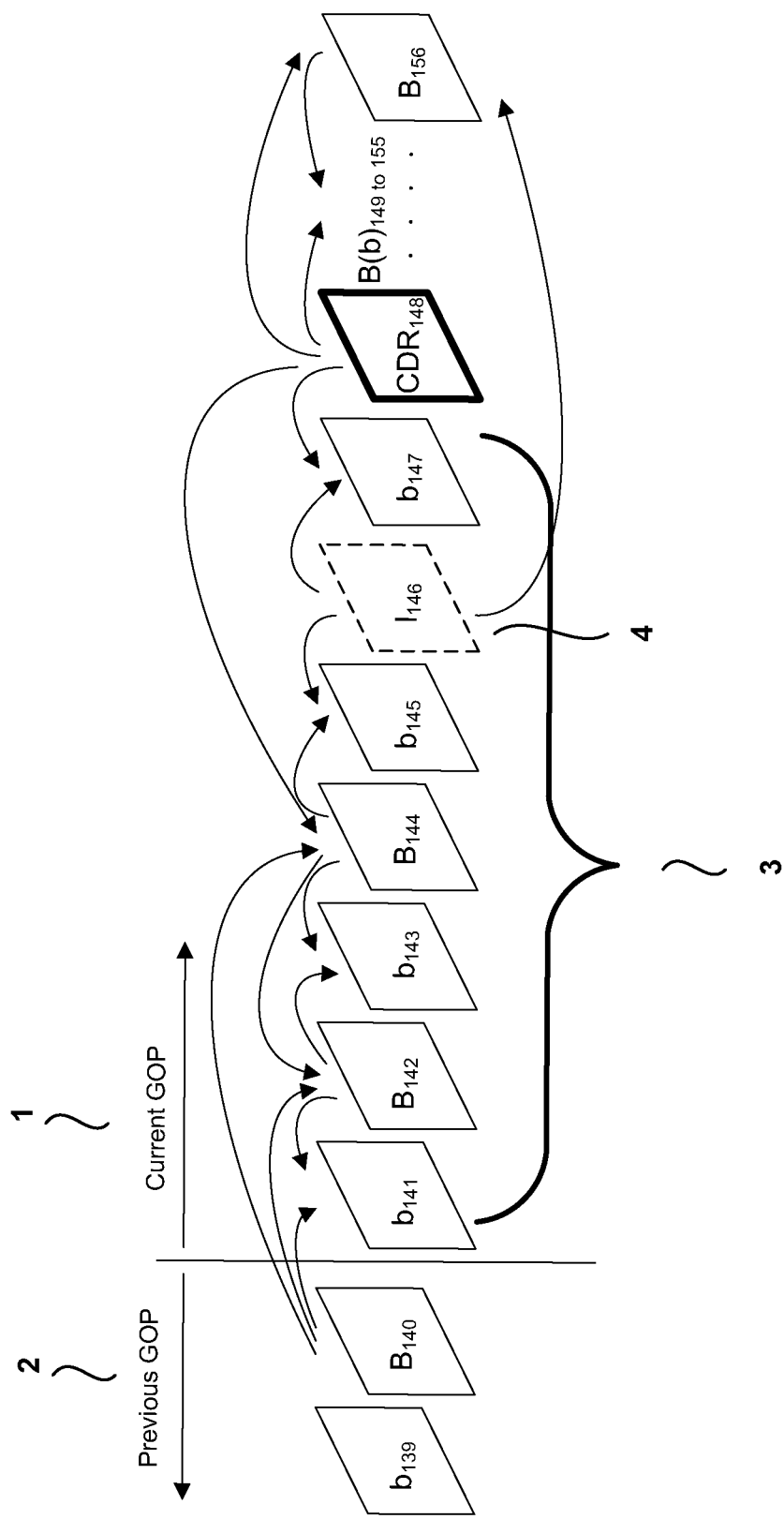
FIG. 1 is a conceptual diagram illustrating an example decoding order of a group of pictures with a clean decoding refresh (CDR) picture and an intra-predicted dependent picture.

Random access in video coding allows a video decoder to decode video at specific time instances with little to no reference to previous video frames. In effect, video coding is "restarted" at a picture designed as a random access point. An example of a clean decoding refresh (CDR) random access point picture is shown in FIG. 1. The pictures in FIG. 1 are shown in display order. The current group of pictures (GOP) 1 includes the pictures with picture order count (POC) from 141-156, including a random access point picture. In this example, the random access point picture is a clean decoding refresh (CDR) picture 148. A CDR picture is a picture that can be decoded without reference to other pictures. For example, the CDR picture may be a picture that only contains intra-predicted slices. A CDR picture differs from an instantaneous decoding refresh (IDR) picture, which is another type of "clean" random access picture. When an IDR picture is used for random access, the decoded picture buffer (DPB) is immediately reset. When a CDR picture is used for random access, the DPB is not immediately reset. This improves the coding efficiency relative to an IDR picture random access.

In FIG. 1, the pictures labeled with a lower case "b" (i.e., pictures 139, 141, 143, 145, and 147) are pictures that are bi-directionally inter predicted from two other pictures, as shown by the arrows. The pointed-to pictures use the pointed-from pictures as predictors in an inter prediction coding process. The pictures with the lower case "b" are not used to predict other pictures. The pictures labeled with the upper case "B" (i.e., pictures 140, 142, 144, and 156) are also pictures that are bi-directionally inter predicted from two other pictures. In contrast with the "b" pictures, the pictures labeled with the upper case "B" are used as predictors for other pictures, as shown by the arrows. Picture $I_{146}$ is an in intra-predicted picture. That is, picture $I_{146}$ is not encoded with reference to other pictures, but rather, uses internal spatial prediction to code the picture. However, picture $I_{46}$ may be used to predict other pictures (e.g., picture $b_{147}$ and $b_{145}$ as shown in FIG. 1).

Some pictures in the current GOP 1 (e.g., the pictures with POC 141 through 147) may not be successfully decoded if decoding is started at $CDR_{148}$ after random access, as pictures from a previous GOP 2 will not be available for inter prediction. That is, if decoding is started from $CDR_{148}$, pictures from a previous GOP may or may not have been decoded. As such, pictures from the previous GOP may not be available for inter prediction. Pictures 141-147 may or may not be needed for inter prediction by pictures following the CDR picture in output order (pictures with POC >148). The pictures that precede the CDR in display order are often called "potentially unnecessary pictures" 3 (pictures 141-147 in FIG. 1).

In the example of FIG. 1, there is one potentially unnecessary picture, $I_{146}$, which can be decoded successfully, even if $CDR_{148}$ is used for random access. $I_{146}$ is still decodable as it is an intra-predicted picture that does not rely on any other pictures to be decoded. In some circumstances, a picture (e.g., $B_{156}$ following $CDR_{148}$ in output order) may use a potentially unnecessary picture (in this case, $I_{146}$) for inter prediction. A potentially unnecessary picture that is used for inter prediction for pictures after the CDR in decoding order and display order is called a dependent picture 4. In the example of FIG. 1, $B_{156}$ is the first picture after the CDR picture in both decoding order and display order. The $CDR_{148}$ can still be used as a random access point, if the decoding of $I_{146}$ is guaranteed, as $I_{146}$ is needed to decode a picture after $CDR_{148}$ in both decoding order and output order (e.g., picture $B_{156}$). If the dependent picture 4 is an intra-predicted picture, a decoder may easily determine that such a picture is decodable.

Figure 2:
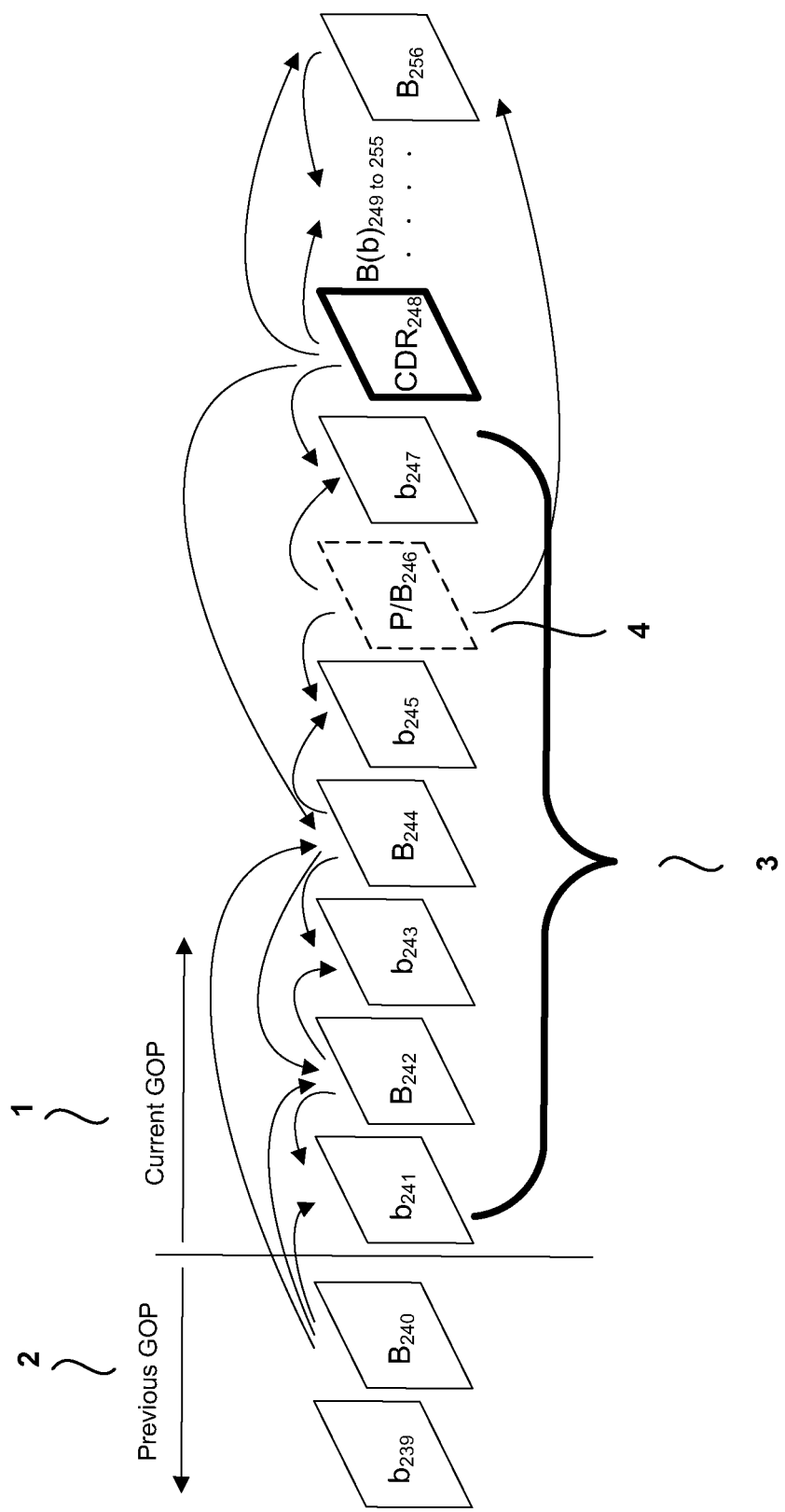
FIG. 2 is a conceptual diagram illustrating an example decoding order of a group of pictures with a clean decoding refresh picture (CDR) and an inter-predicted dependent picture.

FIG. 2 is a conceptual diagram illustrating an example decoding order of a group of pictures with clean decoding refresh picture and an inter-predicted dependent picture. In the example of FIG. 2, the dependent picture 4 is an inter-predicted picture ($P_{246}$ or $B_{246}$). Based on the current definition of CDR in the High Efficiency Video Coding (HEVC) standard, such a situation is disallowed. This is because the decoding of a dependent P or B picture is not guaranteed. If video decoding is started at the CDR picture after random access, it is undetermined if the potentially unnecessary pictures, including any dependent pictures, are decodable because they may be inter predicted from a prediction chain that includes pictures in a previous GOP or from pictures in the current GOP that rely themselves on pictures in a previous GOP. Again, after random access to the CDR picture, pictures in a previous GOP may be unavailable.

Current video codec (encoder/decoder) designs do not support the decoding of dependent pictures. As such, current video codec designs also do not support inter prediction from dependent pictures, while also not decoding any other potentially unnecessary pictures. Decoding of potentially unnecessary pictures is not allowed because it is very difficult to determine if a potentially unnecessary picture can be decoded successfully or not after random access. If the potentially unnecessary picture is an I picture, decoding is possible because an I picture may be decoded without the use of any other picture. However, if the potentially unnecessary picture is a B or P picture (e.g., P246 or B246 in FIG. 2), a video decoder must first determine a complicated prediction chain in order to identify whether or not the potentially unnecessary picture is decodable. For example, a video decoder must first determine the prediction chain of pictures 239-248 in FIG. 2 in order to determine if any of those potentially unnecessary pictures may be successfully decoded. Also, current video codec designs provide no mechanism for allowing a decoder to determine if a potentially unnecessary picture will be used in inter prediction for pictures following the CDR in decoding order (i.e., to determine if the potentially unnecessary picture is a dependent picture).

In view of the above-described drawbacks, the present disclosure proposes the use of a syntax element (e.g., a flag) to be added in picture level syntax and/or slice header syntax as an indication that a potentially unnecessary picture is decodable and may be used for inter prediction for pictures following the CDR in decoding order (i.e., the flag indicates that the potentially unnecessary picture is a decodable dependent picture). The flag may be signalled by an encoder in the encoded video bitstream, as the encoder may determine whether or not the prediction chain for a potentially unnecessary picture allows for successful decoding after random access and whether or not the potentially unnecessary picture may be used for inter prediction for pictures after the CDR in decoding order.

The encoder may track the prediction chain as pictures are encoded and identify pictures as being potentially unnecessary pictures when they are in the same GOP as a CDR. Particular potentially unnecessary pictures may then be assigned a flag (e.g., dependent picture flag) to indicate that they are decodable after random access to the CDR and that they may be used for inter prediction for pictures after the CDR in decoding order (i.e., the flag indicates that the potentially unnecessary pictures is a dependent picture). In one example, an additional indication flag (e.g., dependent indication flag) may be signaled for each GOP that includes a CDR picture. The dependent indication flag with a value of 1, for example, indicates that at least one of the potentially unnecessary pictures in the GOP is a dependent picture. If so, a dependent picture flag is then signaled for each potentially unnecessary picture. The dependent picture flag indicates whether or not a particular potentially unnecessary picture is a dependent picture. If the dependent indication flag has a value of 0, this indicates that no potentially unnecessary picture is a dependent picture in the GOP. As such, the dependent picture flag need not be signaled for that GOP. In another example, the dependent indication flag is not used. Instead, the dependent picture flag is signaled for all potentially unnecessary pictures in a GOP having a CDR picture.

As examples, the dependent indication flag and the dependent picture flag may be signaled in a network abstraction layer (NAL) unit header, a picture level supplemental enhancement information (SEI) message, slice header, or another picture-level syntax element or message to indicate that a potentially unnecessary picture is a dependent picture (i.e., it is both decodable and may be used for inter prediction after random access). A NAL unit is a discrete packet of video data that contains video data for a plurality of pictures contained in a portion of a slice. A picture level SEI message is supplementary information that may apply to the decoding of a picture.

In the case that a CDR in a current GOP has just been selected for random access, the decoder may use this flag to determine whether any potentially unnecessary pictures in the current GOP may be successfully decodable and may be used for inter prediction by pictures following the CDR in decoding order and output order (i.e., determine that the potentially unnecessary picture is a dependent picture).

In another example of the disclosure, the dependent indication flag and/or the dependent picture flag can be added into a file format, e.g., an ISO File format, such that the pictures that are not dependent pictures need to be decoded and/or do not need to be transmitted if the file is encapsulated for transmission in application scenarios, such as video streaming based on HTTP.

The ISO base media file format is designed to contain timed media information for a presentation in a flexible, extensible format that facilitates interchange, management, editing, and presentation of the media. The ISO Base Media File format (ISO/IEC 14496-12:2004) is specified in MPEG-4 Part-12, which defines a general structure for time-based media files. It is used as the basis for other file formats in the family, such as the Advanced Video Coding (AVC) file format (ISO/IEC 14496-15) defined support for H.264/MPEG-4 AVC video compression, 3GPP file format and SVC file format and MVC file format, both of which are extensions of the AVC file format. The ISO Media File Format may also be generally extend to other video coding standards, such as HEVC.

An ISO base media file format may contain the timing, structure, and media information for timed sequences of media data, such as audio-visual presentations. The file structure is object-oriented. A file can be decomposed into basic objects very simply, and the structure of the objects is implied from their type.

A presentation (motion sequence) may be contained in several files. Timing and framing (position and size) information is in the ISO base media file and the ancillary files may essentially use any format. This presentation may be 'local' to the system containing the presentation, or may be via a network or other stream delivery mechanism.

Files conforming to an ISO base media file format are formed as a series of objects, called "boxes." In one example, all data is contained in boxes and there is no other data within the file. This includes any initial signature required by the specific file format. The "box" is an object-oriented building block defined by a unique type identifier and length.

Figure 8:
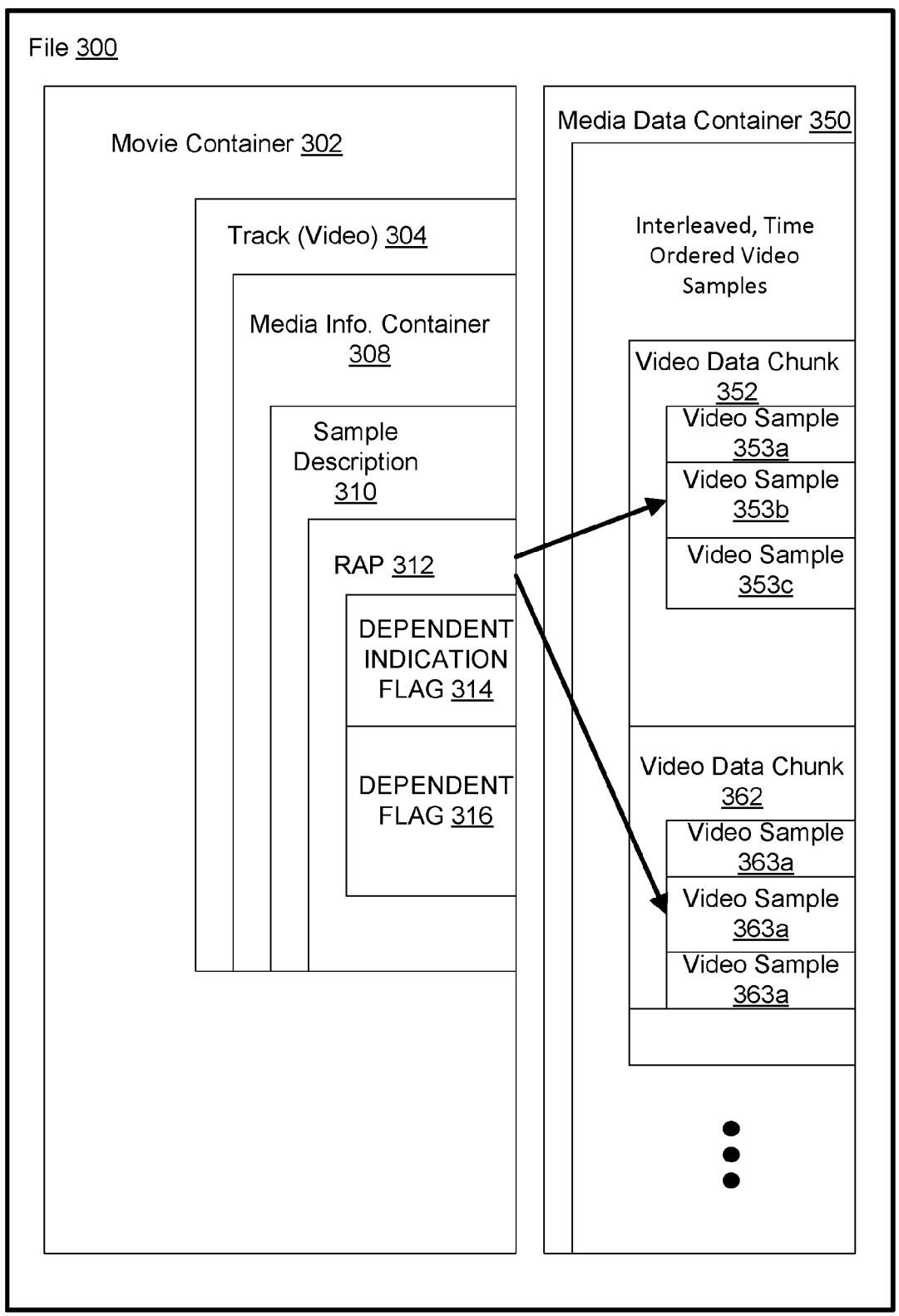
FIG. 8 is a conceptual diagram of an example ISO base media file format.

An example file structure following the ISO base media file format is shown in FIG. 8. Typically, a presentation is contained in one file 300, wherein the media presentation is self-contained. The movie container 302 (e.g., movie box) contains the metadata of the media and the video and audio frames are contained in the media data container 350 and/or in other files.

The movie container 302 may contain metadata for a video track 304. Movie container 302 may also contain other tracks, such as an audio track (not shown). The metadata in video track 304 may be stored in a media information container 308. Media information may include a sample description 310. Sample description 310 may contain the 'name' of the exact media type (e.g., the type of decoder needed to decode the stream) and any parameterization of that decoder needed. The name may also take the form of a four-character code, e.g., "moov," or "trak." There are defined sample entry formats not only for MPEG-4 media, but also for the media types used by other organizations using this file format family.

The media data container 350 may include interleaved time ordered video samples and audio frames. In particular, media data container 350 may include a plurality of video data chunks (e.g., video data chunk 352 and 362). Each video data chunk may include a plurality of video samples (e.g., video samples 353*a-c* and 363*a-c*).

The files have a logical structure, a time structure, and a physical structure. These structures are not required to be coupled. The logical structure of the file is of a movie that in turn contains a set of time-parallel tracks. The time structure of the file is that the tracks contain sequences of samples in time, and those sequences are mapped into the timeline of the overall movie by optional edit lists.

The physical structure of the file separates the data needed for logical, time, and structural de-composition, from the media data samples themselves. This structural information is concentrated in a movie box, possibly extended in time by movie fragment boxes. The movie box documents the logical and timing relationships of the samples, and also contains pointers to where they are located. Those pointers may be into the same file or another one, referenced by a URL.

Support for meta-data takes two forms. First, timed meta-data may be stored in an appropriate track, synchronized as desired with the media data it is describing (e.g., the video data chunks in media container 350). Secondly, there is general support for non-timed meta-data attached to the movie or to an individual track. The structural support is general, and allows, as in the media data, the storage of meta-data resources elsewhere in the file or in another file. In addition, these resources may be named, and may be protected.

In the ISO base media file format, a sample grouping is an assignment of each of the samples in a track to be a member of one sample group. Samples in a sample group are not required to be contiguous. For example, when presenting H.264/AVC in AVC file format, video samples in one temporal level can be sampled into one sample group. Sample groups are represented by two data structures: SampleToGroup box (sbdp) and SampleGroupDescription box. The SampleToGroup box represents the assignment of samples to sample groups. There is one instance of the second box for each sample group entry to describe the properties of this group.

In an ISO based media file format, a second group called the Random Access Point (RAP) 312 sample grouping is defined. A sync sample is specified to be a random access point (e.g., a CDR picture) after which all samples in decoding order can be correctly decoded. However, it may be possible to encode an "open" random access point, after which all samples in output order can be correctly decoded, but some samples following the random access point in decoding order and preceding the random access point in output order need not be correctly decodable. For example, an intra-picture starting an open group of pictures can be followed in decoding order by (bi-)predicted pictures that precede the intra picture in output order. It is possible that such (bi-)predicted pictures cannot be correctly decoded if the decoding starts from the intra picture, and as such, they are not needed.

Such "open" random-access samples can be marked by being a member of this group (denoted by the arrows from RAP 312 to the video samples in video chunk 352 and 362 in FIG. 8). Samples marked by this group are random access points, and may also be sync points (i.e., it is not required that samples marked by the sync sample table be excluded).

An example of random access syntax for an ISO based file format is shown below.

```
class VisualRandomAccessEntry( ) extends VisualSampleGroupEntry
('rap')
{
    unsigned int(1) num_leading_samples_known;
    unsigned int(7) num_leading_samples;
}
```

The syntax element num_leading_samples known equal to 1 indicates that the number of leading samples before the sync point (e.g., a CDR picture) is known for each sample in this group, and the number is specified by the syntax element num_leading_samples. A leading sample is such a sample associated with an "open" random access point (RAP). It precedes the RAP (e.g., a CDR picture) in display order and follows the RAP or another leading sample in decoding order. When decoding starts from the RAP, the sample cannot be correctly decoded. The syntax element num_leading_samples specifies the number of leading samples for each sample in this group. When num_leading_samples known is equal to 0, this field should be ignored.

To further enable the signaling of the dependency flag (dependent_flag), the following syntax is proposed:

```
class VisualRandomAccessEntry( ) extends VisualSampleGroupEntry
('rap')
{
    unsigned int(1) num_leading_samples_known;
    unsigned int(6) num_leading_samples;
    unsigned int(1) depedent_indication_flag;
    if (depedent_indication_flag) {
        for (i = 0 ; i < num_leading_samples ; i++)
            unsigned int (1) dependent_flag;
```

```
        while (i%8 != 0 )
            unsigned int (1) byte_aligne_zero_bit;
    }
}
```

In the above example, the dependent_indication_flag 314 value for the leading pictures is signaled in the decoding order. The dependent_indication_flag 314 indicates whether any of the leading samples (e.g., the potentially unnecessary pictures) are dependent pictures that are correctly decodable following random access to the RAP (e.g., a CDR picture) and are used for decoding pictures following the RAP in output order. If the dependent_indication_flag 314 is true (e.g., has a value of 1), the dependent_flag 316 is then signaled for each of the potentially unnecessary pictures to indicate if a specific picture is dependent or not. If the dependent_indication_flag 314 is false (e.g., has a value of 0), the dependent_flag 316 need not be signaled.

In another example of the disclosure, the dependent_indication_flag 314 is not signaled, and instead, the dependent_flag 316 is signaled for all potentially unnecessary pictures in a group having a RAP (e.g., a CDR picture). For example, a different box may be associated for each sample, and the box may contain such a dependent_flag 316. If the dependent_flag 316 is true, and thus the current picture is a dependent picture after random access, the flag indicates the dependent picture is successfully decodable and may be used for inter prediction by pictures following the CDR in the output order, if the closest CDR is used for random access. If the dependent_flag 316 is false, the picture is not needed for inter prediction for the pictures following the CDR in the output order, and furthermore, the pictures are not needed when random access happens using the CDR.

If the CDR definition is modified accordingly, all the other potentially unnecessary pictures, except the dependent picture (e.g., pictures I146/P246/B246 in FIG. 1 and FIG. 2), need not be decoded when the CDR is used for random access. The potentially unnecessary pictures that are flagged as not being decodable dependent pictures need not be decoded when using the CDR picture for random access, which can simplify decoding.

Figure 3:
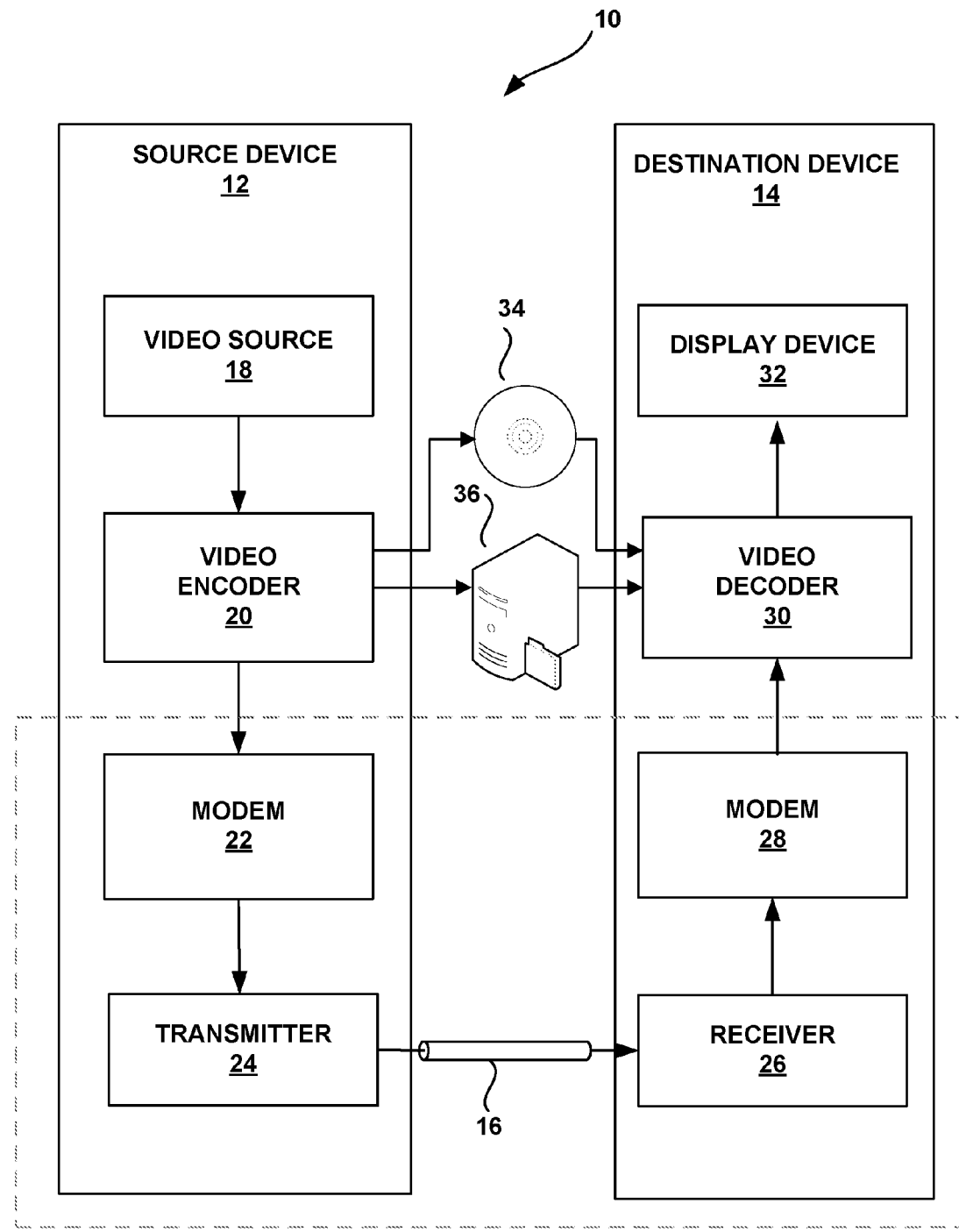
FIG. 3 is a block diagram illustrating an example video encoding and decoding system that may utilize the techniques described in this disclosure.

FIG. 3 is a block diagram illustrating an example video encoding and decoding system 10 that may utilize the random access coding techniques described in this disclosure. As shown in FIG. 3, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded video may also be stored on a storage medium 34 or a file server 36 and may be accessed by the destination device 14 as desired. The storage medium may include any of a variety of locally accessed data storage media such as Blu-ray discs, DVDs, CD-ROMs, flash memory, or any other suitable digital storage media for storing encoded video data. Storage medium 34 or file server 36 may be any other intermediate storage device that may hold the encoded video generated by source device 12, and that destination device 14 may access as desired via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the file server may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 3, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The destination device 14, in the example of FIG. 3, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on a storage medium 34 or a file server 36. Each of the video encoder 20 and the video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). A current draft version of the HEVC standard is presented in JCTVC-H1003, "High Efficiency Video Coding (HEVC) text specification draft 6," version 21, edited by B. Bross, W.-J. Han, G. J. Sullivan, J.-R. Ohm, T. Wiegand, dated Feb. 17, 2012. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 3, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as one or more processors comprising any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The video encoder 20 may implement any or all of the techniques of this disclosure. Likewise, the video decoder 30 may implement any or all of these techniques. As one example, video encoder 20 may be configured to encode a group of pictures that includes a clean decoding refresh (CDR) picture and one or more potentially unnecessary pictures, determine if any of the one or more potentially unnecessary pictures is a dependent picture, determine if the dependent picture is decodable in the case that the CDR picture is used for random access, and signal a syntax element indicating that the dependent picture is determined to be decodable in the case that the CDR picture is used for random access.

As another example, video decoder 30 may be configured to receive a group of pictures including a clean decoding refresh (CDR) picture and one or more potentially unnecessary pictures, and receive a syntax element indicating whether or not any of the one or more potentially unnecessary pictures is a dependent picture that is decodable in the case that a request for random access to the CDR picture is received. Video decoder 30 may be further configured to receive a request for random access to the CDR picture, decode the CDR picture in response to the request for random access, and decode the dependent picture corresponding to the received syntax element.

A video coder, as described in this disclosure, may refer to a video encoder or a video decoder. Similarly, a video encoder and a video decoder may be referred to as video encoding units and video decoding units, respectively. Likewise, video coding may refer to video encoding or video decoding.

The Joint Collaborative Team on Video Coding (JCT-VC) is currently working on development of the HEVC standard. The HEVC standardization efforts are based on an evolving model of a video coding device referred to as the HEVC Test Model (HM). The current HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A CU having one or more PUs may also include one or more transform units (TUs). Following prediction, video encoder 20 may calculate residual values corresponding to the PU. The residual values comprise pixel difference values between a current block of video data and a predictive block of video data. The residual values may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data. The PUs may comprise pixel data in the spatial domain (also referred to as the pixel domain). A TU may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and a predictive video block. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy Codes (PIPE) or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 4:
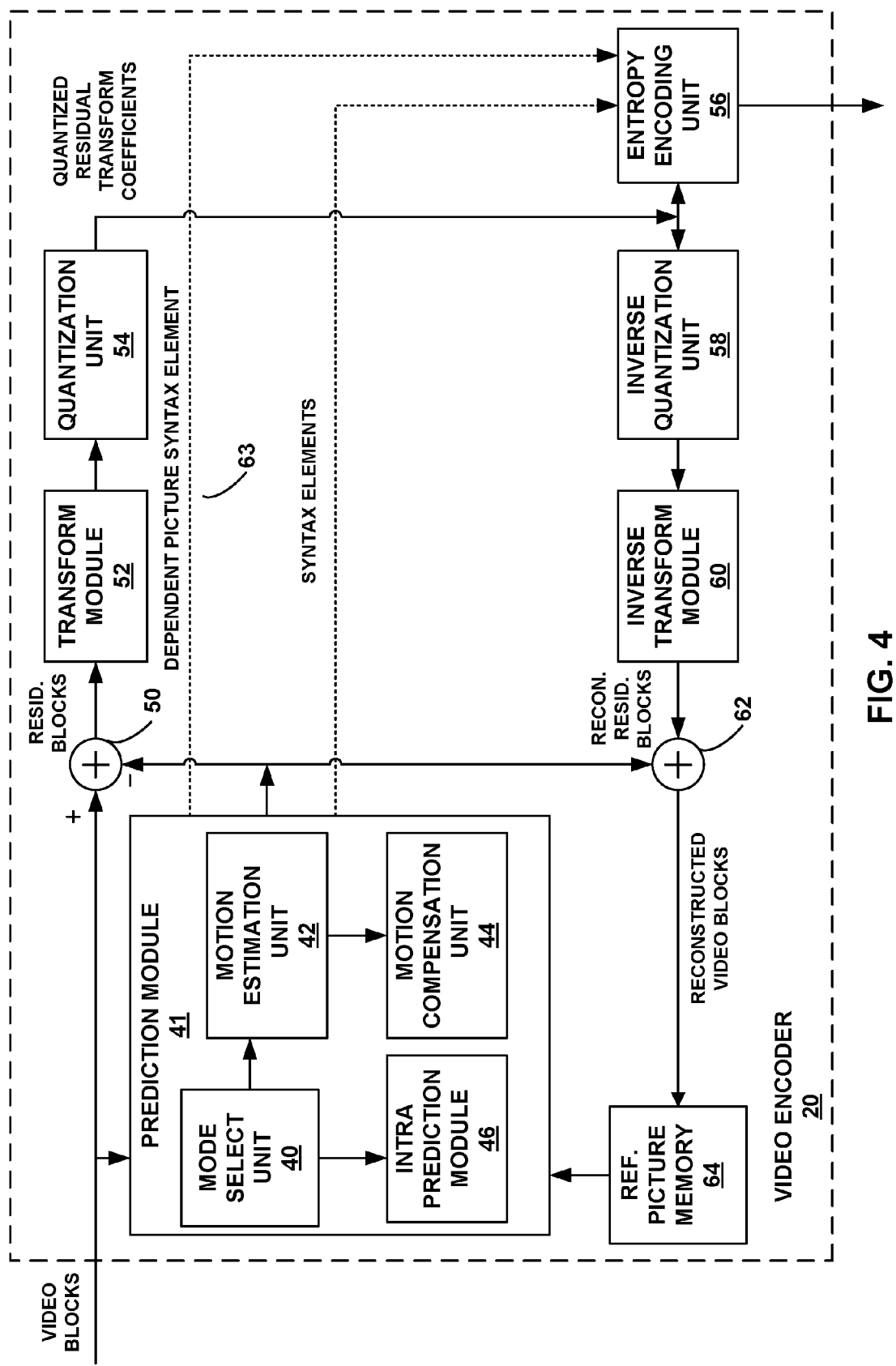
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes prediction module 41, reference picture memory 64, summer 50, transform module 52, quantization unit 54, and entropy encoding unit 56. Prediction module 41 includes mode select unit 40, motion estimation unit 42, motion compensation unit 44, and intra prediction module 46. Prediction module 41, including mode select unit 40, motion estimation unit 42, motion compensation unit 44, and intra prediction module 46 contained therein, may be considered as a portion of the overall video encoder circuitry. Any module or unit described for video encoder 20 may be structured as one or more programmable processors, as hard logic, or any combination thereof. For video block reconstruction, video encoder 20 also includes inverse quantization unit 58, inverse transform module 60, and summer 62. A deblocking filter (not shown in FIG. 4) may also be included to filter block boundaries to remove blockiness artifacts from reconstructed video. If desired, the deblocking filter would typically filter the output of summer 62.

As shown in FIG. 4, video encoder 20 receives a current video block within a video slice to be encoded. The slice may be divided into multiple video blocks. Mode select unit 40 may select one of the coding modes, intra or inter, for the current video block based on error results, and prediction module 41 may provide the resulting intra- or inter-coded block to summer 50 to generate residual block data and to summer 62 to reconstruct the encoded block for use as a reference picture.

Prediction module 41 (or another structural unit of video encoder 20) may also be configured to determine if a current GOP contains any dependent pictures. As described above, a dependent picture is a picture that follows a CDR picture in coding order, but is also used as a prediction picture for another picture that follows the CDR in both coding and display order. Prediction module 41 may track the prediction chain for a GOP that contains a CDR. If a picture is determined to be a dependent picture, prediction module 41 may further determine if the dependent picture is decodable in the case that random access to the CDR occurs. A dependent picture is determined to be decodable if the prediction chain for the dependent picture does not depend on any pictures from a previous GOP (e.g., an inter-predicted B or P picture that is inter-predicted from the CDR or other decodable pictures in the case of a random access to the CDR), or if the dependent picture is an intra-predicted picture (e.g., picture $I_{146}$ of FIG. 1).

The prediction module 41 may signal a dependent picture syntax element 63 (e.g., a dependent flag) in the encoded video bitstream to indicate whether or not a particular potentially unnecessary picture is a dependent picture that is decodable in the case of random access to a CDR picture. Dependent picture syntax element 63 may be entropy coded by entropy coding unit 56 for inclusion in the encoded video bitstream. As discussed above, the dependent picture syntax element may be signaled in a network abstraction layer (NAL) unit header, a picture level supplemental enhancement information (SEI) message, slice header, or another picture-level syntax element or message. The dependent picture syntax element 63 may also be stored in a file format, as described above.

It should be understood that prediction module 41 is just one example of a structural component of video encoder 20 that may generate dependent picture syntax element 63. Other structural or functional units of video encoder 20, either alone or in combination, may be configured to generate a dependent picture syntax element using the techniques described above.

Intra prediction module 46 within prediction module 41 may perform intra-predictive coding of the current video block relative to one or more neighboring blocks in the same frame or slice as the current block to be coded to provide spatial compression. Motion estimation unit 42 and motion compensation unit 44 within prediction module 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After motion compensation unit 44 generates the predictive block for the current video block, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 5:
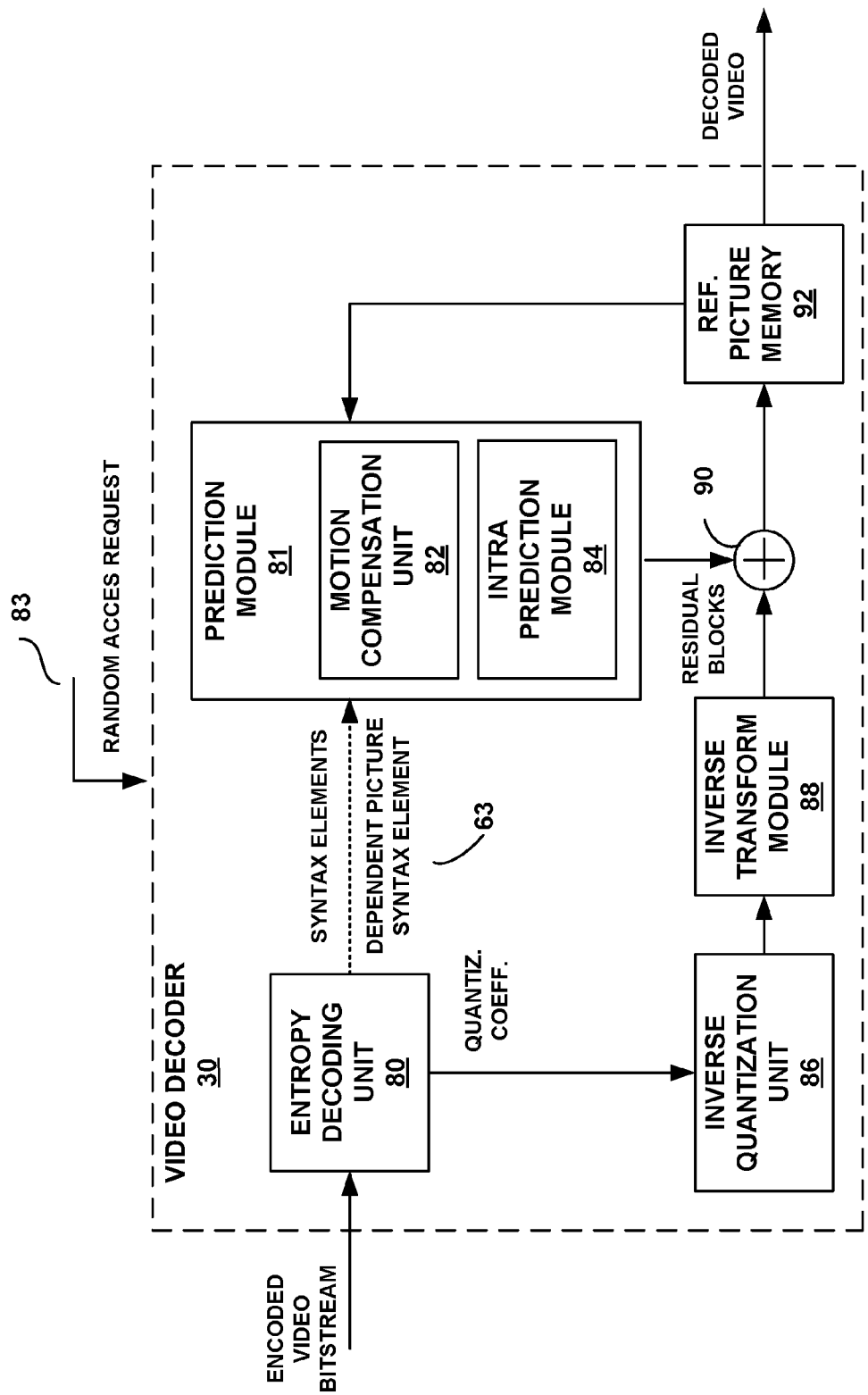
FIG. 5 is a block diagram illustrating an example video decoder that may implement the techniques described in this disclosure.

FIG. 5 is a block diagram illustrating an example video decoder 30 that may implement the techniques described in this disclosure. In the example of FIG. 5, video decoder 30 includes an entropy decoding unit 80, prediction module 81, inverse quantization unit 86, inverse transformation unit 88, summer 90, and reference picture memory 92. Prediction module 81 includes motion compensation unit 82 and intra prediction module 84. Prediction module 81, may be considered as a portion of the overall video decoder circuitry. Any module or unit described for video decoder 30 may be structured as one or more programmable processors, as hard logic, or any combination thereof. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements, including dependent picture syntax element 63, generated by a video encoder (e.g., video encoder 20). Entropy decoding unit 80 of video decoder 30 entropy decodes the bitstream to generate quantized coefficients, motion vectors, and other syntax elements. Entropy decoding unit 80 forwards the motion vectors and other syntax elements to prediction module 81. Video decoder 30 may receive the syntax elements at the video picture level, the video slice level and/or the video block level. As discussed above, the dependent picture syntax element may be signaled in a network abstraction layer (NAL) unit header, a picture level supplemental enhancement information (SEI) message, slice header, or another picture-level syntax element or message. The dependent picture syntax element 63 may also be stored in a file format, as described above.

Some groups of picture received by video decoder 30 in the encoded video bitstream may include CDR pictures. Pictures in a GOP with a CDR picture may also include dependent picture syntax element 63 which indicates if any of the potentially unnecessary pictures are dependent pictures in the GOP and are decodable in the case of a request for random access to the CDR in that GOP. In the case that a random access request 83 is received, e.g., from a user via a user interface of a computing device providing video playback, video decoder 30 may begin decoding at the CDR associated with GOP and may decode any dependent pictures in accordance with the received dependent picture syntax element 63. That is, if the dependent picture syntax element 63 indicates that an associated potentially unnecessary picture is a dependent picture that is decodable in the case of random access, that dependent picture is decoded. If the dependent picture syntax element 63 indicates that the associated potentially unnecessary picture is not a decodable dependent picture, that potentially unnecessary picture may be discarded and not decoded. Again, a potentially unnecessary picture may be identified by the decoder 30 as a picture in the same GOP as the CDR, but that precedes the CDR in display order.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction module 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. Motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform module 88 with the corresponding predictive blocks generated by motion compensation unit 82. Summer 90 represents the component or components that perform this summation operation. If desired, a deblocking filter may also be applied to filter the decoded blocks in order to remove blockiness artifacts. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 3.

Figure 6:
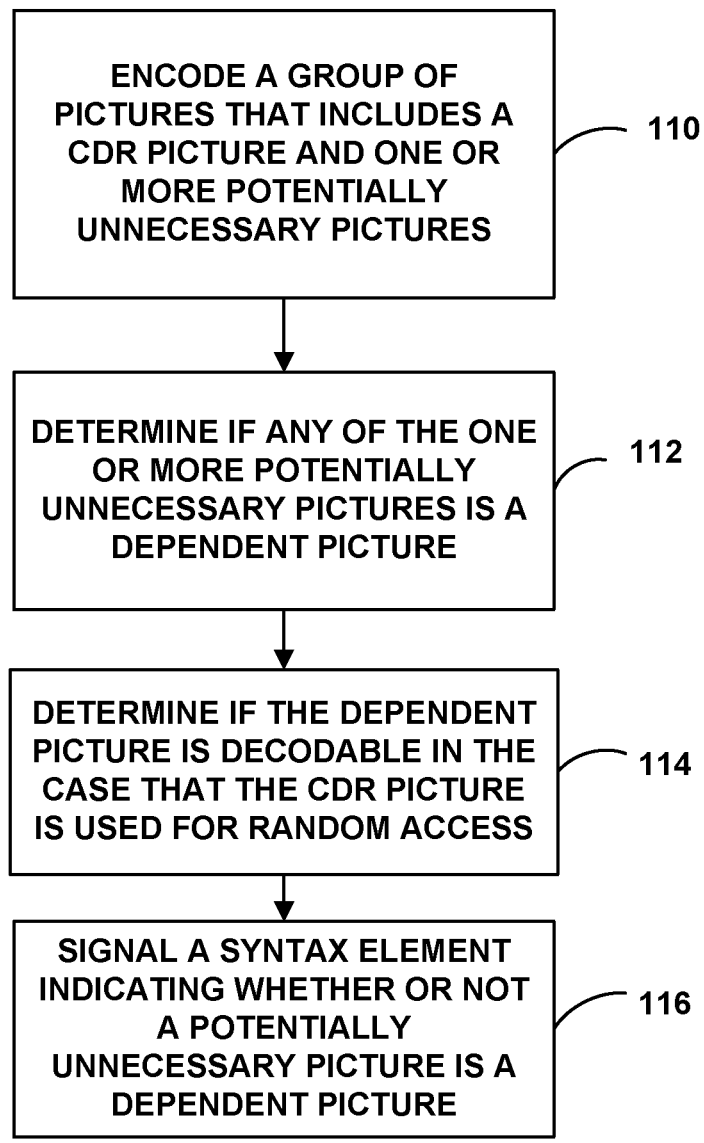
FIG. 6 is an example flowchart of a video encoding method according to the techniques of this disclosure.

FIG. 6 is an example flowchart of a video encoding method according to the techniques of this disclosure described above. The techniques of FIG. 6 may be implemented by a video encoder, such as video encoder 20 of FIG. 4. Video encoder 20 may be configured to encode a group of pictures (GOP) that includes a clean decoding refresh (CDR) picture and one or more potentially unnecessary pictures (110). The one or more potentially unnecessary pictures follow the CDR picture in decoding order and precede the CDR picture in display order. Video encoder 20 may also determine if any of the one or more potentially unnecessary pictures is a dependent picture (112). The dependent picture is used for inter-prediction of a picture that follows the CDR picture in both decoding order and display order.

If any of the potentially unnecessary pictures is a dependent picture, video encoder 20 may further determine if the dependent picture is decodable in the case that the CDR picture is used for random access (114), as is described above with reference to FIG. 4. Video encoder 20 may further signal a syntax element in an encoded video data bitstream indicating that a potentially unnecessary picture is a dependent picture that is determined to be decodable in the case that the CDR picture is used for random access (116). In one example, the syntax element may be signaled in one or more of a network abstraction layer unit header and a picture level supplemental enhancement information (SEI) message. In another example, the syntax element is signaled in a file format, as described above.

Figure 7:
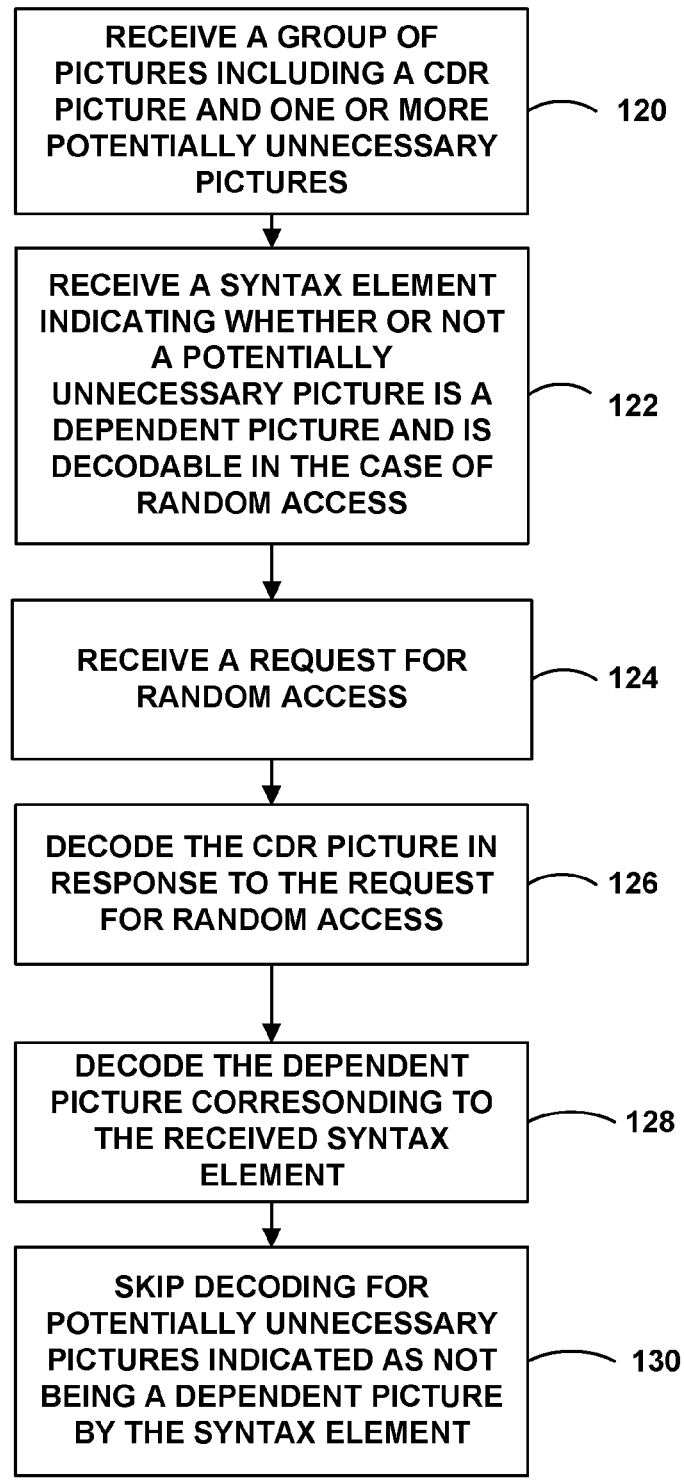
FIG. 7 is an example flowchart of a video decoding method according to the techniques of the disclosure.

FIG. 7 is an example flowchart of a video decoding method according to the techniques of the disclosure described above. The techniques of FIG. 7 may be implemented by a video decoder, such as video decoder 30 of FIG. 5. Video decoder 30 may be configured to receive a group of pictures including a clean decoding refresh (CDR) picture and one or more potentially unnecessary pictures (120). Video decoder 30 may be further configured to receive a syntax element indicating that a potentially unnecessary pictures is a dependent picture and is decodable in the case that a request for random access to the CDR picture is received (122). The dependent picture is used for inter-prediction of a picture that follows the CDR picture in both decoding order and display order.

Video decoder 30 may be further configured to receive a request for random access to the CDR picture (124). In the case that a random access request is received, video decoder 30 may be further configured to decode the CDR picture in response to the request for random access (126), and to decode the dependent picture corresponding to the received syntax element (128). Additionally, video decoder 30 may also be configured to skip decoding for any of the one or more potentially unnecessary pictures indicated as not being dependent pictures by the syntax element (130). In one example, the syntax element is received in one or more of a network abstraction layer unit header and a picture level supplemental enhancement information (SEI) message. In another example, the syntax element is stored in a file format, as described above.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

receiving, with a video decoder, an encoded video bitstream, the encoded video bitstream comprising a group of pictures including a random access picture and one or more potentially unnecessary pictures that precede the random access picture in display order;

receiving, with the video decoder, in the encoded video bitstream, a syntax element in a network abstraction layer (NAL) unit header indicating whether or not one of the potentially unnecessary pictures is decodable in the case that a request for random access to the random access picture is received;

receiving, with the video decoder, a request for random access to the random access picture;

decoding, with the video decoder, the random access picture in response to the request for random access;

determining, with the video decoder, whether or not the syntax element indicates that the one potentially unnecessary picture is decodable based on the syntax element; and processing, with the video decoder, the one potentially unnecessary picture based on the determination, wherein processing the one potentially unnecessary picture includes:

decoding, with the video decoder, the one potentially unnecessary picture based on the determination that the syntax element indicates that the one potentially unnecessary picture is decodable; and discarding, with the video decoder, the one potentially unnecessary picture based on the determination that the syntax element indicates that the one potentially unnecessary picture is not decodable.

2. The method of claim 1, further comprising:

determining, with the video decoder, if any of the one or more potentially unnecessary pictures determined to be decodable is a dependent picture, and using the dependent picture for inter-prediction of at least one picture that follows the random access picture in both decoding order and display order.

3. The method of claim 1, further comprising:

receiving the syntax element in a file format container for the one or more potentially unnecessary pictures.

4. The method of claim 1, wherein the random access picture is a clean decoding refresh (CDR) picture.

5. An apparatus configured to of decode video data, the apparatus comprising:

a memory configured to store an encoded video bitstream of video data; and a video decoder configured to:

receive the encoded video bitstream, the encoded video bitstream comprising a group of pictures, wherein the group of pictures includes a random access picture and one or more potentially unnecessary pictures that precede the random access picture in display order;

receive, in the encoded video bitstream, a syntax element in a network abstraction layer (NAL) unit header indicating whether or not one of the potentially unnecessary pictures is decodable in the case that a request for random access to the random access picture is received;

receive a request for random access to the random access picture;

decode the random access picture in response to the request for random access;

determine whether or not the syntax element indicates that the one potentially unnecessary picture is decodable based on the syntax element; and process the one potentially unnecessary picture based on the determination, wherein to process the one potentially unnecessary picture, the video decoder is further configured to:

decode the one potentially unnecessary picture based on the determination that the syntax element indicates that the one potentially unnecessary picture is decodable; and discard the one potentially unnecessary picture based on the determination that the syntax element indicates that the one potentially unnecessary picture is not decodable.

6. The apparatus of claim 5, wherein the video decoder is further configured to determine if any of the one or more potentially unnecessary pictures determined to be decodable is a dependent picture, and use the dependent picture for inter-prediction of at least one picture that follows the random access picture in both decoding order and display order.

7. The apparatus of claim 5, wherein the video decoder is further configured to receive the syntax element in a file format container for the one or more potentially unnecessary pictures.

8. The apparatus of claim 5, wherein the random access picture is a clean decoding refresh (CDR) picture.

9. An apparatus configured to decode video data, the apparatus comprising:

means for receiving an encoded video bitstream, the encoded video bitstream comprising a group of pictures including a random access picture and one or more potentially unnecessary pictures that precede the random access picture in display order;

means for receiving, in the encoded video bitstream, a syntax element in a network abstraction layer (NAL) unit header indicating whether or not one of the potentially unnecessary pictures is decodable in the case that a request for random access to the random access picture is received;

means for receiving a request for random access to the random access picture;

means for decoding the random access picture in response to the request for random access;

means for determining whether or not the syntax element indicates that the one potentially unnecessary picture is decodable based on the syntax element and means for processing the one potentially unnecessary picture based on the determination, wherein the means for processing the one potentially unnecessary picture includes:

means for decoding the one potentially unnecessary picture based on the determination that the syntax element indicates that the one potentially unnecessary picture is decodable; and means for discarding the one potentially unnecessary picture based on the determination that the syntax element indicates that the one potentially unnecessary picture is not decodable.

10. The apparatus of claim 9, further comprising:

means for determining if any of the one or more potentially unnecessary pictures determined to be decodable is a dependent picture; and means for using the dependent picture for inter-prediction of at least one picture that follows the random access picture in both decoding order and display order.

11. The apparatus of claim 9, further comprising:

means for receiving the syntax element in a file format container for the one or more potentially unnecessary pictures.

12. The apparatus of claim 9, wherein the random access picture is a clean decoding refresh (CDR) picture.

13. A non-transitory computer-readable medium storing instructions that, when executed, cause one or more processors of a device configured to decode video data to:

receive an encoded video bitstream, the encoded video bitstream comprising a group of pictures including a random access picture and one or more potentially unnecessary pictures that precede the random access picture in display order; and receive, in the encoded video bitstream, a syntax element in a network abstraction layer (NAL) unit header indicating whether or not one of the potentially unnecessary pictures is decodable in the case that a request for random access to the random access picture is received;

receive a request for random access to the random access picture;

decode the random access picture in response to the request for random access;

determine whether or not the syntax element indicates that the one potentially unnecessary picture is decodable based on the syntax element; and process the one potentially unnecessary picture based on the determination, wherein to process the one potentially unnecessary picture, the instructions further cause the one or more processors to:

decode the one potentially unnecessary picture based on the determination that the syntax element indicates that the one potentially unnecessary picture is decodable; and discard the one potentially unnecessary picture based on the determination that the syntax element indicates that the one potentially unnecessary picture is not decodable.

14. The non-transitory computer-readable medium of claim 13, wherein the instructions further cause the one or more processors to determine if any of the one or more potentially unnecessary pictures determined to be decodable is a dependent picture, and use the dependent picture for inter-prediction of at least one picture that follows the random access picture in both decoding order and display order.

15. The non-transitory computer-readable medium of claim 13, wherein the instructions further cause the one or more processors to receive the syntax element in a file format.

16. The non-transitory computer-readable medium of claim 13, wherein the random access picture is a clean decoding refresh (CDR) picture.

* * * * *